United States Patent [19]

Stifter

[11] 4,228,494
[45] Oct. 14, 1980

[54] CONSTANT CURRENT SOURCE

[76] Inventor: Francis J. Stifter, c/o Electronic Specialists, Inc., 171 S. Main St., Natick, Mass. 01760

[21] Appl. No.: 934,030

[22] Filed: Aug. 16, 1978

[51] Int. Cl.$^2$ .................................. H02P 13/26
[52] U.S. Cl. .................................. 363/85; 323/4; 323/9; 323/22 SC; 363/128
[58] Field of Search ............ 323/4, 22 SC, 34, 9; 363/81, 84, 85, 86, 54, 118, 128

[56] References Cited

U.S. PATENT DOCUMENTS

| | | | |
|---|---|---|---|
| 3,311,806 | 3/1967 | Charlwood | 363/86 |
| 3,448,342 | 6/1969 | Jacobs | 323/9 |
| 3,460,017 | 8/1969 | Eggleston et al. | 323/4 X |
| 3,590,323 | 6/1971 | Mapham et al. | 363/54 X |
| 3,634,734 | 1/1972 | Scott | 323/22 SC X |
| 3,713,011 | 1/1973 | Johnson et al. | 363/85 X |
| 3,838,332 | 9/1974 | Hopengarten | 363/85 |
| 3,922,595 | 11/1975 | Vieri | 363/54 |
| 3,987,354 | 10/1976 | Mason | 323/4 X |

*Primary Examiner*—William M. Shoop
*Attorney, Agent, or Firm*—John E. Toupal

[57] ABSTRACT

A constant current circuit including a silicon controlled rectifier connected to transmit current flow from an ac supply to a load. A sensor circuit provides a load signal having a level dependent upon the current flow through the load and a reference circuit provides a reference signal having a predetermined given level. Receiving the load and reference signals is a comparator with an output connected to an SCR firing control network that furnishes firing signals to a gate of the silicon controlled rectifier. The output from the comparator varies the firing signal produced by a phase shift network in response to a reference signal level greater than the level of the load signal and retards the phase of the firing signal in response to a load signal level greater than the given reference level.

9 Claims, 1 Drawing Figure

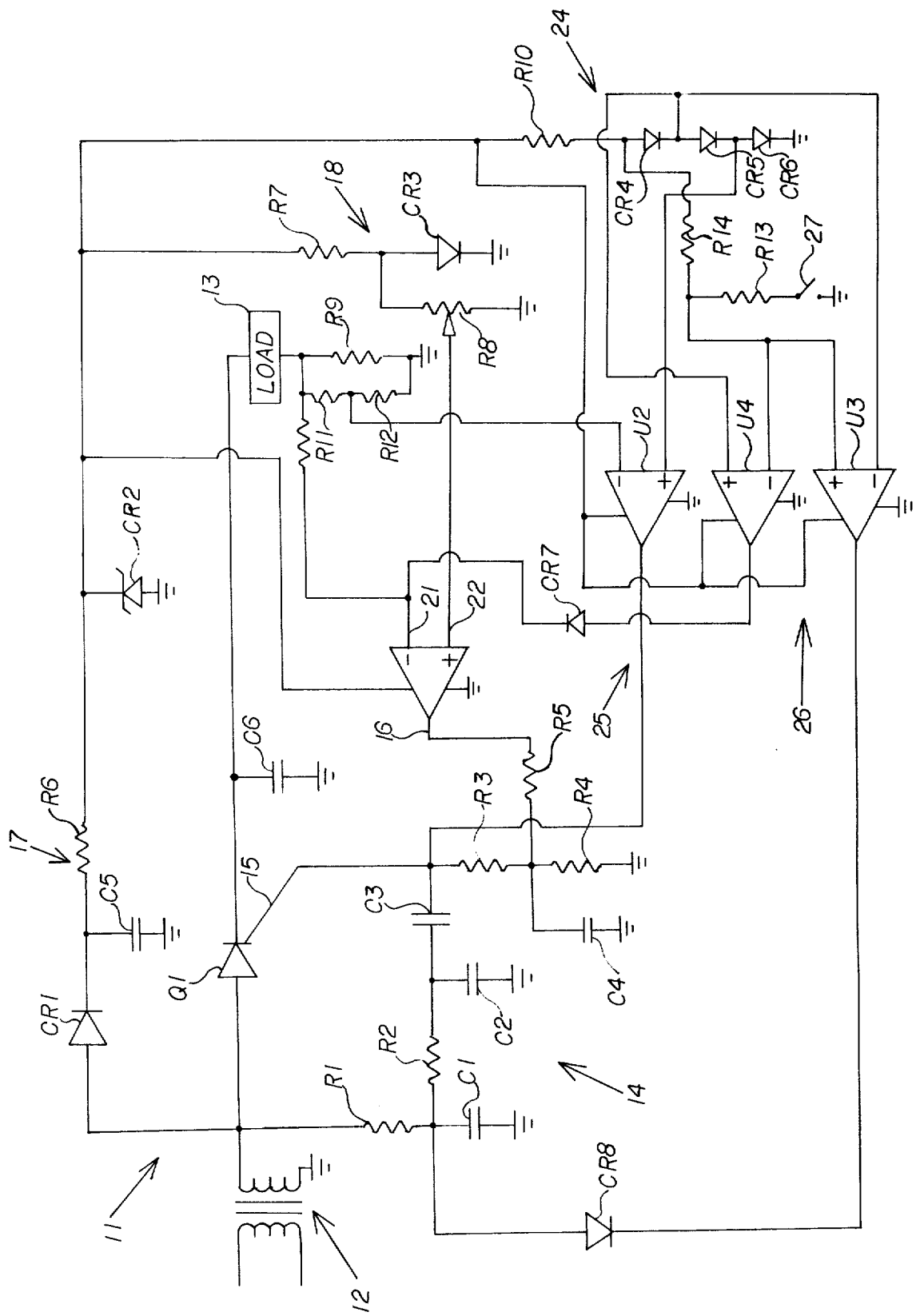

CONSTANT CURRENT SOURCE

BACKGROUND OF THE INVENTION

This invention relates generally to a current source and, more particularly, to a current source with a silicon control rectifier that provides a constant output current.

Constant current sources are required in numerous electronic applications. Such sources generally entail a regulated power supply which acts to keep its output current constant in spite of changes in load, line or temperature. Although various types of constant current sources have been developed, a need continues to exist for improved constant current sources that are reliable, energy efficient and of relatively low cost.

The object of this invention, therefore, is to provide a highly efficient, relatively low cost current source that reliably maintains a constant output current.

SUMMARY OF THE INVENTION

The invention is a constant current circuit including a silicon controlled rectifier connected to transmit current flow from an ac supply to a load. A sensor circuit provides a load signal having a level dependent upon the current flow through the load and a reference circuit provides a reference signal having a predetermined given level. Receiving the load and reference signals is a comparator with an output connected to a phase shift network that furnishes firing signals to a gate of the silicon controlled rectifier. The output from the comparator advances the phase of the firing signal produced by the phase shift network in response to a reference signal level greater than the level of the load signal and retards the phase of the firing signal in response to a load signal level greater than the given reference level. Variations in the phase of its firing signal causes the silicon controlled rectifier to maintain a constant output current determined by the predetermined level of the reference signal.

In a preferred embodiment of the invention, the comparator comprises an operational amplifier having one input receiving the reference signal and a second input receiving the load signal. The output of the operational amplifier varies the charge on a capacitor and thereby changes the dc level on the gate of the silicon controlled rectifier. Altering the dc level on its gate either advances or retards the phase of the firing signal applied to the silicon controlled rectifier.

One feature of the invention is the provision of a shutoff circuit that can be activated to short positive half cycles supplied by the ac supply to the phase shift network. Shorting of the positive half cycles disables the silicon controlled rectifier to terminate current flow to the load. Thus, the shut-off circuit permits selective termination of load current.

Another feature of the invention is the provision of a limit circuit that reduces the voltage applied to the gate electrode of the silicon controlled rectifier in response to a load current flow exceeding a predetermined value. The limit circuit functions to prevent an increase in load current to above some preselected maximum value.

DESCRIPTION OF THE DRAWING

These and other features and objects of the present invention will become more apparent upon a perusal of the following description taken in conjunction with the drawing which is a schematic circuit diagram of a preferred embodiment of the invention.

DESCRIPTION OF THE PREFERRED EMBODIMENT

Schematically illustrated in the drawing is a circuit diagram of a constant current source 11 according to the present invention. The circuit 11 includes a silicon controlled rectifier Q1 that transmits current flow from an ac supply 12 to a load 13. Connected between the ac supply 12 and a gate electrode 15 of the rectifier Q1 is a phase shift network 14 including resistors R1 and R2 and capacitors C1, C2 and C3 that provide a sine wave phase shift signal to the gate electrode 15. Also included in the phase shift network 14 is a control network including resistors R3, R4 and R5 and a control capacitor C4 that are connected between the gate electrode 15 and an output of an operational amplifier U1. A voltage supply network 17 including a diode CR1, a capacitor C5, a resistor R6 and a zener diode CR2 is connected between the ac supply 12 and a reference voltage network 18. The network 17 also provides supply voltage for the amplifier U1. Included in the reference voltage network 18 is a resistor R7, a diode CR3 and a variable resistor R8 connected to a junction therebetween. A filter network composed of a capacitor C6 is connected between the rectifier Q1 and the load 13. Connected in series with the load 13 is a sensing resistor R9 that provides a load signal to one input 21 of the amplifier U1. The value of the load signal provided to the input 21 is determined, of course, by the level of current flow through the load 13. Another input 22 of the amplifier U1 receives a reference signal level established by the setting of the adjustable resistor R8. In response to the two voltages on amplifier U1, the output thereof varies, increasing or decreasing the voltage on the capacitor C4 and on the gate 15 of the rectifier Q1. This either advances or retards the phase of the firing signal on the rectifier Q1 delivering a greater or lesser charge to the capacitor C6. Also connected to the voltage supply network 17 is a series combination of diodes CR4, CR5 and CR6 that function as a voltage divider 24.

The maximum current flow through load 13 is controlled by a current limiting circuit 25 including an operational amplifier U2 and a pair of resistors R11 and R12 connected across the sensor resistor R9. One input of the amplifier U2 is connected to the junction between the diodes CR5 and CR6 in the voltage divider 24 while another input thereof is connected to the junction between the resistors R11 and R12. The output of the amplifier U2 is connected to the junction between the resistor R3 and the Q1 gate.

The constant current source 11 also includes a current shut-off circuit 26 including a pair of operational amplifiers U3 and U4. One input of the amplifier U4 is connected through R14 to a junction between the resistor R10 and the diode CR4 in the divider network 24 and to the switch 27 and through resistor R13 to permit grounding of this input. The other input of the amplifier U4 is connected to a junction between the diodes CR4 and CR5 in the divider network 24. Connecting the output of the amplifier U4 to the input 21 of the amplifier U1 is a diode CR7. One input of the amplifier U3 is connected to the junction between the resistors R10 and the diode CR4 in the divider network 24 through the resistor R14. Switch 27 and the resistor R13 permit grounding this input. The other input of U3 is connected to the junction of the diodes CR4 and CR5.

Connecting the output of the amplifier U3 to a junction between the resistor R1 and the capacitor C1 in the phase shift network 14 is a diode CR8.

CIRCUIT OPERATION

The phase shift network 14 provides a sine wave control signal to the gate electrode 15 that periodically fires the rectifier Q1 charging the capacitor C6 and supplying current flow to the load 13. The level of that load current is sensed by the resistor R9 that provides a load signal to the input 21 of the amplifier U1. The sensed level of that load signal is compared by the amplifier U1 to a given reference signal level on the input 22 established by the manual adjustment of the variable resistor R8. In response to a given reference signal on the input 22 greater than the sensed signal level on the input 21, the amplifier U1 produces a high output signal level that charges the control capacitor C4 through resistor R5. The resultant higher voltage on the control capacitor C4 causes the delayed sine wave applied to the gate electrode 15 to initiate an earlier firing of the rectifier Q1. Consequently, a higher voltage is developed on the filter capacitor C6 and more current is driven through the load 13 to raise the level of the load signal applied to the input 21. In response to a load signal level on the input 21 greater than the given reference signal on the input 22, the amplifier U1 produces a low or lower output that results in a lower voltage on the control capacitor C4. This, in turn, causes the delayed sine wave applied to the gate electrode 15 to initiate a later firing of the rectifier Q1. Accordingly, the voltage across the filter capacitor C6 is reduced, in turn reducing the level of current through the load 13. Thus, the circuit 11 seeks an equilibrium condition wherein the load signal level on input 21 is equal to the given reference signal level on the input 22 resulting in a constant current through the load 13 that is dependent upon the setting of the variable resistor R8.

The values of the resistors R1 and R2 and the capacitors C1 and C2 are chosen to determine the minimum level of desired load current while the values of the resistor R6 and the supply network 17 are chosen to determine maximum load current. In an application having very low ripple requirements, the filter capacitor C6 can be replaced with an LC filter of a required number of elements that would substantially eliminate ripple to the load 13. In that event, the amplifier U1 would operate in an active region with little or no cycling between high and low states at equilibrium condition.

The limit circuit 25 prevents the occurrence of excessive current flow through the load 13. In response to load current exceeding a predetermined maximum, the voltage appearing at the junction between the resistors R11 and R12 exceeds the reference voltage received by the amplifier U2 from the divider network 24. This causes the output of the amplifier U2 to reduce the voltage applied to the gate electrode 15 of the rectifier Q1 and thereby reduce current flow to the load 13.

In certain situations, a complete termination of load current is desirable. This capability is provided in the present invention by the shut-off circuit 26. Manual closure of the switch 27 causes the amplifier U4 to force the output of the amplifier U1 to a low state and causes the amplifier U3 to short through the diode CR8 positive half cycles delivered to the phase shift network 14 by the ac supply 12. Consequently, no firing voltage is available at the gate electrode 15 of the rectifier Q1 and load current is interrupted.

Obviously, many modifications and variations of the present invention are possible in light of the above teachings. For example only, the reference network 18 could be replaced with a digital-to-analog converter if digital control is desired. Similarly a position or pressure sensitive feedback could be used if a servo control were desired or the shut-off circuit 26 and 27 could be digitally controlled. Also, full wave supplies with two SCR's or triacs could be employed, as could three-phase configurations. It is to be understood, therefore, that the invention can be practiced otherwise than as specifically described.

What is claimed is:

1. A constant current circuit comprising:
   ac supply means;
   rectifier means connected to transmit current flow from said ac supply means to said load means, said rectifier means comprising a semiconductor switch having a gate electrode for controlling said current flow;
   a phase shift network connected to provide a firing signal from said ac supply means to said gate electrode;
   sensor means providing a load signal having a sensing level dependent on the level of said current flow;
   reference means providing a reference signal having a given level;
   comparator means for comparing said sensing and given signal levels and producing an output signal responsive thereto, said comparator means applying said output signal to said phase shift network so as to advance the phase of said firing signal in response to said given level being greater than said sensing level and to retard the phase of said firing signal in response to said sensing level being greater than said given level so as to maintain a constant level of current flow to said load; and
   selective shut-off circuit means for shorting the positive half cycles supplied by said ac supply means to said phase shift network so as to disable said semiconductor switch and terminate said current flow.

2. A constant current circuit according to claim 1 including filter network means connected between said load means and said rectifier means.

3. A constant current circuit according to claim 2 wherein said comparator means comprises an operational amplifier having an input connected to receive said reference signal, a second input connected to receive said load signal, and an output providing said output signal.

4. A constant current circuit according to claim 3 wherein said output signal has a first level in response to said given level being greater than said sensing level and a second level in response to said sensing level being greater than said given level, and said phase shift network comprises a capacitor means the charge on which is varied by said first and second output signal levels.

5. A constant current circuit according to claim 1 including limit circuit means for limiting the maximum value of said current flow.

6. A constant current circuit according to claim 5 wherein said limit circuit means comprises means for reducing the voltage applied to said gate electrode in response to said current flow exceeding a predetermined value.

7. A constant current circuit according to claim 6 including filter network means connected between said load means and said rectifier means.

8. A constant current circuit according to claim 7 wherein said comparator means comprises an operational amplifier having an input connected to receive said reference signal, a second input connected to receive said load signal, and an output providing said output signal.

9. A constant current circuit according to claim 8 wherein said output signal has a first level in response to said given level being greater than said sensing level and a second level in response to said sensing level being greater than said given level, and said phase shift network comprises a capacitor means the charge on which is varied by said first and second output signal levels.

* * * * *